Nov. 20, 1962 E. G. COX 3,065,020
CONVEYANCE SEAT WITH SWING-AWAY BACKREST
Filed Sept. 2, 1959
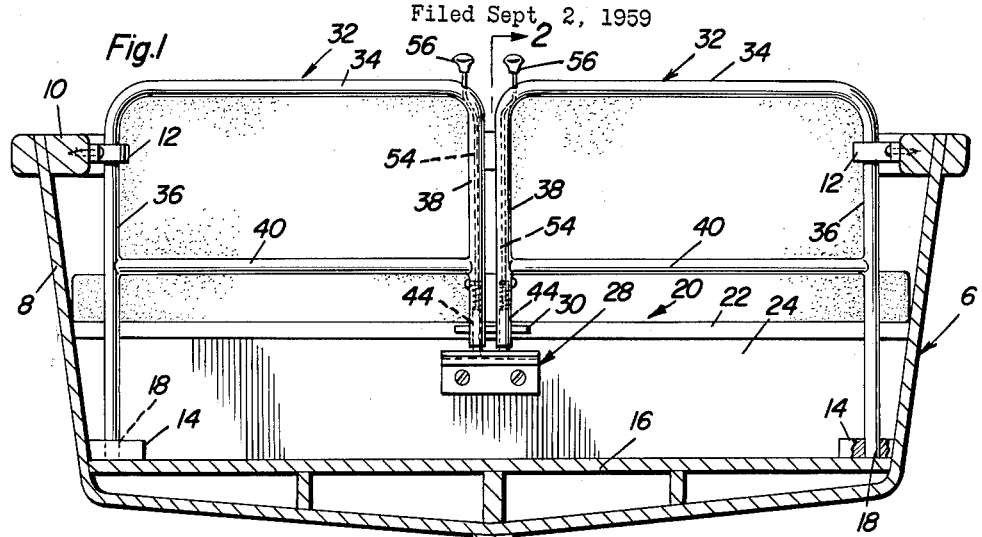
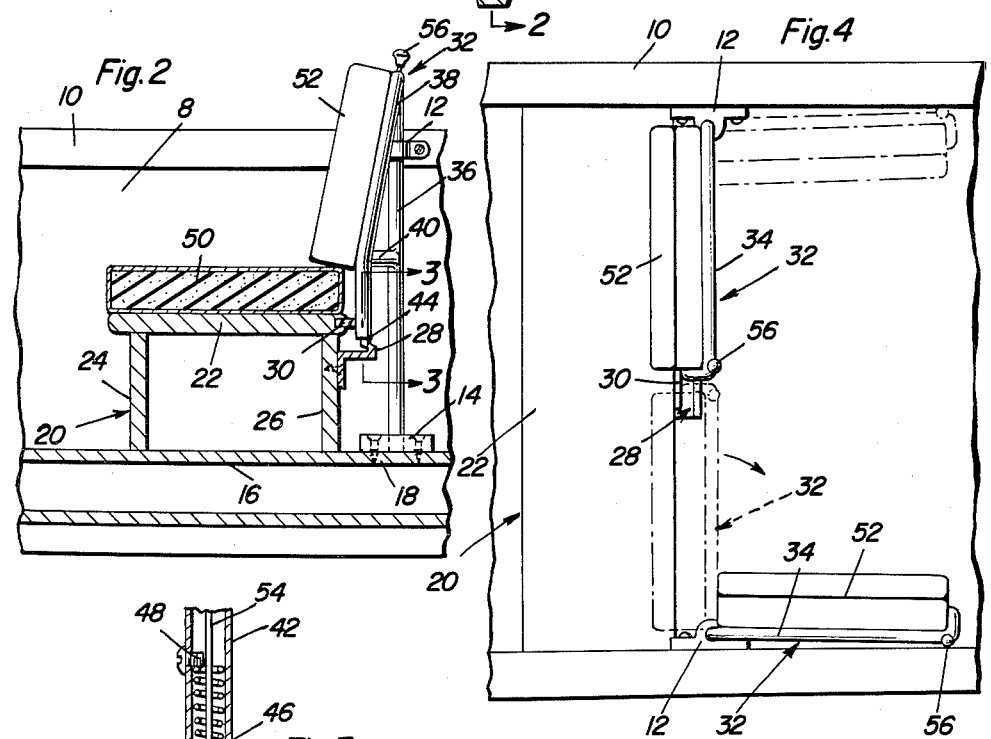
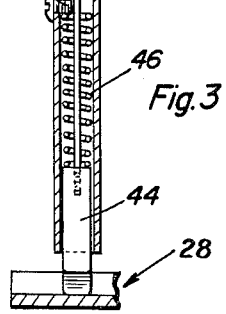
Edward G. Cox
INVENTOR.

United States Patent Office 3,065,020
Patented Nov. 20, 1962

3,065,020
CONVEYANCE SEAT WITH SWING-AWAY BACKREST
Edward G. Cox, Box 205, Cannelton, Ind.
Filed Sept. 2, 1959, Ser. No. 837,657
7 Claims. (Cl. 296—65)

This invention relates, broadly construed, to an improved seat construction for conveyances and has reference; more particularly, to that portion thereof commonly referred to as the back or, alternatively, the backrest, and wherein the back is retractible and comprises substantially duplicate half-sections which may be moved to an out-of-the-way position whenever necessary or desired.

As will be evident from the above, the invention herein under consideration pertains to occupant seating means which lends itself to practical and acceptable use in connection with many and varied conveyances. This is to say, that while the construction was initially devised for adoption and desirable use, say in a boat, it may and could be equally well adapted to reliable use in various types of vehicles such as, for example, sports cars, station wagons, delivery trucks, so-called camping wagons and the like, especially where, when the back is swung away from the seat proper, the latter may be converted into a bed. In addition, a swing-away seat back serves to permit an occupant to leave the seat and move to other quarters without being hampered and where space is limited and moving about is inconvenient or perhaps hazardous for one reason or another.

An object of the invention is to structurally, functionally and otherwise improve upon conveyance seat constructions and, in doing so, to provide a highly simple and practical seat back or backrest which is such in construction that it may be satisfactorily made from various available materials such as wood, metal, suitable plastic materials or, and this may be more desirable, constructed from lightweight but sturdy metal or aluminum tubing.

Insofar as the seat proper is concerned it may be a simple bench with appropriate cushioning means. The rearward portion of this part of the seat construction may be provided with a keeper bracket, and an anti-rattling bumper whereby to thus provide an adaptation suitable to the hingedly mounted swing-away back or backrest. Here again the backrest may be a simple frame with appropriate cushioning means and which is also provided with a spring-loaded catch or latch which is automatically engageable with the keeper when the frame is swung to a closed position, the latch being remote controlled so that it may be released when one desires to swing the backrest to an out-of-the-way position.

More specifically, the seat back comprises an inverted U-shaped frame with long and short legs. The outer long leg provides a hinging post and the inner shorter leg provides a latch post. Suitable reinforcing means may be added if desired.

Other objects, features and advantages will become more readily apparent from the following description and the accompanying drawings.

In the drawing, wherein like numerals are employed to designate like parts throughout the views:

FIG. 1 is a view in rear elevation showing the seat proper and a pair of swingaway backs or backrests with the latter in their closed latched position, the seat assembly being shown, for illustration only, in the occupant's space of a boat.

FIG. 2 is a section on the vertical line 2—2 of FIG. 1 looking in the direction of the arrows.

FIG. 3 is an exaggerated view in section and elevation taken on the vertical line 3—3 of FIG. 2.

FIG. 4 is a fragmentary top plan view showing in full and dotted line illustrations how the seat backs or backrests are openable and closable.

To facilitate describing the invention it is to be understood that the "conveyance" is in the form of a boat which is denoted by the numeral 6. The side walls 8 are provided with rails 10 here shown equipped with simple suitably attached bearing brackets 12. A complemental bearing block or an equivalent anchor 14 is provided on the floor 16 directly beneath the bearing 12 and has a socket providing a bearing as at 18.

Although the seat may be of some other construction it is here shown as in the form of an elongated bench 20 having a seat board 22 and a front wall or apron 24 and a rear wall or apron 26. As already mentioned this part 26 is provided with a right angle keeper bracket or keeper seat 28. This bracket as seen in FIG. 1 is located at about the center or midway between the ends of the wall 26. It is situated directly below a rubber bumper 30. The keeper and bumper serve to accommodate the swing-away gate-type half-sections or backrests. Broadly and briefly each section or backrest is denoted by the numeral 32. It may vary in construction to include hinging means and latch carrying means. More particularly an inverted U-shaped tubular frame is employed and this has a bight portion 34, an outwardy disposed long leg 36 providing a hinging post and a companion shorter inner leg 38 providing a latch post. As shown the hinging post is journalled for rotation in the bearings 12 and 18. Thus this gate-like frame when not in use may be swung to the out-of-the-way position shown for example in full lines in the lower portion of FIG. 4. The legs or limbs are reinforced by suitable braces 40 connected therewith. The lower end portion of the inner or short leg 38 as seen in FIG. 3 is hollow and provides a socket member 42 in which a projectible and retractible spring-loaded latch or catch is mounted. This latch is denoted at 44 and is pressed or biased by the coil spring 46 to the latching position shown. The upper end of the spring may be held by a stop screw or the like 48. Since the seat board 22 is relatively long and like a bench it will be obvious that a pair of these gate-like sections or backrests are used and of course the disclosure is intended to comprehend the use of either one or more seat backs preferably of the construction shown. If desired, a suitable cushion 50 may be provided on the seat board and likewise an appropriate cushion 52 may be mounted on the frame to swing in conjunction therewith. It will be noticed that the latch 44 is remote controlled by way of a trip rod or wire 54 which extends up through the tube and above the upper end of the leg 38 where it is provided with a control knob 56. If one is sitting on the seat and desires to move, let us say to the rear of the boat, all he has to do is reach up and catch hold of the knob 56 and lift it and release the latch. Then, the section may be swung to and held in an out-of-the-way position in a seemingly obvious manner. Also, and as already mentioned it is permissible to swing both of the sections away and to out-of-the-way positions whenever sleeping quarters are to be utilized.

It is to be added that the bearings 12 and 18 may be replaced by other equivalent hinging members (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle body including a bottom, spaced opposed side walls, a seat extending between the side walls, a backrest for the seat, said backrest comprising a pair of half-sections hingedly mounted at one end on the side walls and swingable rearwardly in a horizontal plane to an inoperative position adjacent to and parallel with the side walls for providing a substantially unobstructed passageway of a material width over the seat, and means for releasably securing the sections in an operative position parallel with the seat.

2. In combination, a vehicle body including a bottom, spaced opposed side walls, a seat extending between the side walls, a backrest for the seat, said backrest comprising a pair of half-sections hingedly mounted at one end on the side walls and swingable rearwardly in a horizontal plane to an inoperative position adjacent to and parallel with the side walls for providing a substantially unobstructed passageway of a material width over the seat, and means for releasably securing the sections in an operative position parallel with the seat, said means comprising a keeper mounted on the rear of the seat, and spring-projected latches slidably mounted on the free end portions of the sections and operatively engageable with said keeper.

3. The combination of claim 2, together with a resilient bumper on the seat for arresting the sections in the forward swinging movement thereof when the latches operatively engage the keeper.

4. The combination of claim 2, said sections comprising tubular frames, said latches including bolts operable in said frames, and means for retracting the bolts.

5. The combination of claim 4, said frames being generally inverted U-shaped, said bolt retracting means including wires in the frames connected at one end to the bolts and slidably emerging from the frames at a bend therein.

6. In combination, a vehicle body including spaced, opposed walls, a seat extending between said walls, a backrest for the seat, said backrest comprising a pair of half-sections, said half-sections including horizontally swingable, generally inverted U-shaped tubular frames including outer legs journaled on the side walls and free inner legs, a keeper on the seat, and spring-projected bolts slidable in the inner legs and engageable with the keeper for releasably locking the backrest sections in an operative position parallel with the seat.

7. The combination of claim 6, together with means for retracting the bolts, said means comprising wires operable in the inner legs and having one end portion connected to the bolts, the other end portions of said wires slidably emerging from the frames at the junctures of the inner legs therewith for providing access to said wires.

References Cited in the file of this patent

UNITED STATES PATENTS

| | | |
|---|---|---|
| 1,586,483 | Speegle | May 25, 1926 |
| 1,705,592 | Smith | Mar. 19, 1929 |
| 2,288,535 | Marx | June 30, 1942 |
| 2,495,520 | Grimm | Jan. 24, 1950 |
| 2,610,329 | Strathaus | Sept. 16, 1952 |
| 2,679,653 | Blanke | June 1, 1954 |